US012637022B2

(12) United States Patent
Schäfers et al.

(10) Patent No.: US 12,637,022 B2
(45) Date of Patent: May 26, 2026

(54) SYSTEM FOR IDENTIFYING AT LEAST ONE SENSOR DEVICE

(71) Applicant: SAF-HOLLAND GmbH, Bessenbach (DE)

(72) Inventors: Simon Schäfers, Nidderau-Erbstadt (DE); Daniel Müller, Aschaffenburg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 55 days.

(21) Appl. No.: 18/704,737

(22) PCT Filed: Oct. 26, 2022

(86) PCT No.: PCT/EP2022/079958
§ 371 (c)(1),
(2) Date: Apr. 25, 2024

(87) PCT Pub. No.: WO2023/073035
PCT Pub. Date: May 4, 2023

(65) Prior Publication Data
US 2024/0416852 A1 Dec. 19, 2024

(30) Foreign Application Priority Data
Oct. 27, 2021 (DE) ..................... 10 2021 128 020.6

(51) Int. Cl.
B60R 16/023 (2006.01)
(52) U.S. Cl.
CPC ................................ B60R 16/0232 (2013.01)

(58) Field of Classification Search
CPC .................................................. B60C 23/0416
See application file for complete search history.

(56) References Cited

U.S. PATENT DOCUMENTS

2003/0227379 A1 12/2003 Itou
2005/0258953 A1* 11/2005 Saitou ................. B60C 23/0408
340/447
(Continued)

FOREIGN PATENT DOCUMENTS

DE 102005055964 A1 5/2007
DE 102007028926 B3 10/2008
(Continued)

*Primary Examiner* — Davetta W Goins
*Assistant Examiner* — Pameshanand Mahase
(74) *Attorney, Agent, or Firm* — Price Heneveld LLP

(57) ABSTRACT

A system for identifying at least one sensor device, in or on a vehicle, the system including the at least one sensor device for detecting measurement signals and at least one measuring point, wherein at least one of the sensor devices is and/or can be positioned at the at least one measuring point, and a control unit for collecting and/or evaluating the measurement signals detected by the at least one sensor device, wherein the at least one sensor device and/or the at least measuring point is configured to detect and/or generate a position-dependent identification signal and forward the signal to the control unit, wherein the control unit is configured to assign the at least one sensor device and/or the measurement signals detected by the at least one sensor device to the respective measuring point on the basis of the identification signal.

16 Claims, 4 Drawing Sheets

(56)     References Cited

U.S. PATENT DOCUMENTS

| | | |
|---|---|---|
| 2006/0020377 A1 | 1/2006 | Goetz et al. |
| 2016/0033351 A1* | 2/2016 | Ban ....................... G01L 27/005 |
| | | 73/1.57 |
| 2020/0031366 A1* | 1/2020 | Robson .............. B60C 23/0406 |
| 2020/0124697 A1 | 4/2020 | Gueble |
| 2023/0065157 A1* | 3/2023 | Löffler ................. B60C 23/007 |

FOREIGN PATENT DOCUMENTS

| | | |
|---|---|---|
| DE | 102011050636 B4 | 4/2015 |
| DE | 102016118641 A1 | 4/2018 |
| DE | 102020202029 A1 | 8/2021 |
| EP | 1284556 A1 | 2/2003 |
| EP | 2693280 B1 | 12/2017 |
| EP | 3439920 B1 | 3/2020 |
| JP | 2008168814 A | 7/2008 |

* cited by examiner

101

101

103

104

20

SYSTEM FOR IDENTIFYING AT LEAST ONE SENSOR DEVICE

BACKGROUND

The invention relates to a system for identifying at least one sensor device in or on a vehicle, a vehicle, in particular a commercial vehicle and/or trailer, comprising such a system and a method for identifying at least one sensor device in or on a vehicle.

It is known in the prior art to automatically record and monitor various operating and status variables on vehicles using sensors. The data is recorded by the sensors and transmitted to an evaluation unit or a central system, for example. However, especially when several measuring points or several sensors are provided at different positions, the question arises as to how these sensors can transmit their signal to the central system efficiently and as error-free as possible. It may be desirable not only to determine and transmit the measurement signal, but also to register the measuring point or the exact position, e.g. the axle, the wheel or the brake disk, at which the sensor has determined an operating and/or status variable. This can be used to indicate to the driver or a technician, for example, at which point a problem has occurred.

In the prior art, for example, it is common practice to enable identification of the sensors by establishing a direct cable connection between a central system and the respective sensor. Setting up a star topology, in particular with a central hub unit for evaluating and/or forwarding the data, is also a possible variant.

However, this can easily lead to confusion if, for example, the position of two sensors is swapped during installation. This can occur, for example, if the position is not yet known or not yet fixed when the sensor is delivered and/or if a mounting position can vary, in particular due to several equivalent mounting positions. Furthermore, laying the cables for each individual sensor can be time-consuming and material-intensive if a large number of sensors are provided.

It is therefore the object of the invention to provide a system that enables the positioning of various sensors in a vehicle to be identified reliably and efficiently.

SUMMARY OF THE INVENTION

According to a first aspect of the invention, a system for identifying at least one sensor device, preferably a plurality of sensor devices, in particular in or on a vehicle, is provided, wherein the system comprises the at least one sensor device for detecting measurement signals and at least one measuring point, preferably a plurality of measuring points, wherein at least one of the sensor devices is positioned and/or positionable at the measuring point or the measuring points in each case, wherein the system comprises a control unit, in particular a central control unit, for collecting and/or evaluating the measurement signals detected by the at least one sensor device, wherein the at least one sensor device and/or the measuring point is configured to detect and/or generate an identification signal, in particular a position-dependent identification signal, and to forward it to the, in particular central, control unit, wherein the, in particular central, control unit is configured to assign the at least one sensor device and/or the measurement signals detected by the at least one sensor device to the respective measuring point on the basis of the identification signal. The vehicle can preferably be a commercial vehicle, preferably with a permissible total weight of over 3.5 tons, particularly preferably over 7.5 tons and most particularly preferably over 18 tons. The vehicle is in particular a roadworthy and/or road-bound vehicle. The sensor device can preferably be configured to detect operating and/or status variables of the vehicle and/or of components of the vehicle, in particular in the form of measurement signals. Detected components of the vehicle can be, for example, a wheel, a tire, a vehicle axle, a brake, in particular a disc brake, and/or parts thereof. Measurement signals can be, for example, a temperature, a voltage and/or a pressure, in particular air pressure. The sensor device can, for example, comprise a temperature sensor, a pressure sensor, a voltage sensor, an acoustic sensor and/or an optical sensor or be formed by such a sensor. For example, the sensor device can be configured to detect the temperature of a disc brake and/or the air pressure of a tire. The identification of the sensor device can in particular be a local or local identification. In particular, the identification of the sensor device can comprise a local, preferably relative, position, in particular within the vehicle, and/or an assignment of the sensor device to a possible installation location and/or to a measuring point. Alternatively or additionally preferably, the identification can also comprise a unique assignment, in particular a serial number, for the sensor or the sensor device or be formed by such information. The measuring point can be a position, in particular a predetermined position, at which the sensor device is arranged or positioned and/or can and/or should be arranged or positioned. The measuring point may, for example, comprise fastening means for fastening the sensor device and/or connections, e.g. data connections and/or power supply connections, for the sensor device. For example, the sensor device can be plugged, clipped and/or screwed into the measuring point. Preferably, several measuring points are provided, wherein a sensor device can be connected in particular to different, preferably all, measuring points or is compatible with different, preferably all, measuring points. The measuring point and/or the sensor device is configured to detect and/or generate an identification signal, which may in particular be position-dependent. For example, this may be a positioning signal, wherein the positioning signal may in particular be used to determine a position of the sensor device in the vehicle. In particular, the identification signal can enable conclusions to be drawn about a position relative to the vehicle and/or relative to a reference position in the vehicle and/or the identification signal can be dependent on the measuring point or the sensor device. In particular, the identification signal can therefore be or comprise an, advantageously unique or unambiguous, ID of the measuring point and/or the sensor device. The measuring point and/or the sensor device is configured to forward the identification signal to the control unit. The system can comprise data lines, in particular from the measuring point to the control unit, which are configured to forward the identification signal to the control unit. The forwarding can alternatively or additionally be provided via a wireless connection, e.g. by means of a WiFi or Bluetooth connection. It is conceivable that the sensor device is configured to detect and/or generate the identification signal, while the measuring point is configured to forward the identification signal to the control unit or vice versa. Alternatively or additionally, the measuring point and/or the sensor device can be configured both for detecting and/or generating and for forwarding the identification signal. The identification signal can, for example, be transmitted together with a measurement signal, in particular to enable direct assignment of the measurement signal to the identification signal or to the measuring point at which the sensor device is positioned. The control unit can preferably comprise a computer unit, a data memory and/or a user interface. The control unit may be configured to collect, evaluate, process and/or present the measurement signals to a user. In particular, the control unit can be configured to evaluate the identification signal and to use the evaluation to determine at which position or at which measuring point the sensor device is arranged. In particular, the control unit can be configured to assign several sensor devices to their respective measuring points. Advantageously, a positioning of the sensor device can thus be identified automatically. This can be particularly advantageous if there are several equivalent positions or measuring points in the vehicle at which the sensor device can be arranged or positioned. In particular, larger measuring systems, for example in conjunction with bus communication, can be implemented in the vehicle. The automatic detection of the position of the sensor device can achieve a high level of reliability in the unambiguous assignment of transmitted measurement signals to the respective measuring points. For example, an otherwise unclear positioning of the sensor device in a bus system can be determined or recognized.

Advantageously, each of the measuring points and/or the sensor devices can be connected to the control unit, in particular the central control unit, in terms of information technology, in particular via a common line or via different lines, wherein the preferably common line is configured in particular for transmitting the measurement signals and/or the identification signal. The common line can, for example, be a ring system and/or a bus system. A set of identical common lines can also be provided, e.g. in the form of a data bus system, in order to be able to transmit a larger amount of data, for example. The common line can optionally also be configured to supply power to the measuring points and/or the sensor devices. It may be provided that the system comprises a common line for forwarding measurement signals and a further common line for identifying the sensor devices. In particular, the common line may comprise a data path with a width of 4 bits to 32 bits. The common line can optionally also be bidirectional, i.e. in particular configured so that, in addition to the measurement and/or identification signals that can be transmitted to the control unit, control signals can be transmitted from the control unit to the sensor device. The control unit can be configured to generate control signals and, in particular via the common line, to send them to the sensor device or the sensor devices. This can be, for example, a signal for detecting and forwarding measurement signals and/or an instruction for identifying the sensor device, in particular locally. By providing a common line, material, installation space and/or installation effort can be saved, in particular compared to the use of individual lines for each of the measuring points or sensor devices. While it can be fundamentally problematic in the case of a common line to make a clear assignment of the individual sensor devices or the measurement signals of the sensor devices, in particular automatically, the identification according to the invention can achieve a clear assignment even in the case of a common line.

Advantageously, the at least one sensor device and/or the at least one measuring point can be configured to generate the identification signal on the basis of a detected time difference and/or on the basis of a signal propagation time, in particular in connection with a current vehicle speed. Preferably, the signal propagation time or the detected time difference is directly related to the position of the measuring point or the sensor device positioned at the measuring point. In particular, the signal propagation time or the time of a detected event can be linked to the vehicle speed, for example by using an element located outside the vehicle as a reference. A sensor unit can be arranged at the at least one measuring point and/or the at least one sensor device. In particular, the sensor unit can be configured to detect an event and/or an object entering its detection range at a specific time. For example, the sensor unit can be configured to detect, in an installed state, the passing over of an obstacle and/or the passing of a predetermined object. The sensor unit can be an acceleration sensor, a signal receiver or a sound sensor, for example. The system may comprise a reference sensor unit, which is configured in particular to be installed in a vehicle at a predetermined location and/or arranged in the vehicle. The reference sensor unit can be configured, in particular analogously to the sensor unit, to detect an event and/or an object entering its detection range, wherein this detection can be assigned to a point in time. In particular, the reference sensor unit can be configured in the same way as the sensor unit. The time difference can be a time difference between one signal detection each of the reference sensor unit and the sensor unit. For example, a time at which the reference sensor unit passes an object and another time at which the sensor unit passes an object can form the time difference. Alternatively or additionally, the time difference can also be a signal propagation time of a signal, wherein in particular a signal line of the signal from a signal transmitter to the sensor device or the measuring point can be configured to delay the signal, in particular to delay it to a different extent for each measuring point. Thus, this embodiment can represent a possibility of local identification associated with little additional material expenditure.

Advantageously, the at least one sensor device can be part of a series circuit, wherein the series circuit comprises in particular a voltage source, wherein the at least one sensor device is configured to generate the identification signal on the basis of a signal, in particular a voltage signal, transmitted via the series circuit. In particular, the series circuit may comprise several sensor devices, wherein the series circuit is configured in such a way that the signal transmitted via the series circuit is different at each sensor device. The identification signal can preferably be defined by a predetermined characteristic, for example by the time at which the signal reaches the sensor device, by an amplitude or magnitude of the signal, e.g. the magnitude of a voltage, and/or by a signal curve. Advantageously, in this embodiment, the system can be configured to utilize influences on a signal that are already present due to the environment and/or the design conditions of the vehicle in order to generate or determine the identification signal, e.g. in the form of a voltage drop in a bus system.

Advantageously, the series circuit can be a resistor series circuit, wherein the resistor series circuit comprises a voltage source for generating a voltage, wherein the sensor device is configured to generate the identification signal on the basis of a voltage applied to the at least one sensor device, wherein the resistor series circuit is designed in particular such that the applied voltage is dependent on the position of the respective measuring point. Preferably, the resistor series circuit is designed independently and/or separately from a supply line to the power supply of the sensor device. The resistor series circuit can provide an easy-to-implement option for generating a position-dependent identification signal, particularly in relation to other elements of the series circuit, in particular by using the lower voltage after each resistor as a reference. In this embodiment, the identification signal can be the value of a voltage. In particular, the resistor series circuit may comprise a plurality of sensor devices and/or measuring points connected in series, each of the sensor devices and/or measuring points comprising an electrical resistor which is part of the resistor series circuit. It may be provided that when the sensor device is connected to the measuring point, the respective resistor of the sensor device is automatically integrated into the resistor series circuit. Particularly preferably, the resistor can be part of the measuring point and in any case be part of the resistor series circuit, wherein in particular a voltage behind the resistor is detected when the sensor device is connected to the measuring point. The sensor device can comprise a voltage sensor that is configured to detect the voltage of the resistor series circuit at the measuring point and, in particular, to use it as an identification signal. Alternatively, the voltage sensor can also be part of the measuring point and the measuring point can be configured to send the identification signal to the sensor device and/or to forward the identification signal, advantageously together with a signal, in particular a measurement signal, from the sensor device, to the control unit. In this embodiment, the detected voltage is particularly lower the more resistors are arranged between the voltage source and the measuring point. Consequently, the detected voltage is different at each measuring point and can be used to determine the position, in particular within the series circuit, or the location within the series circuit of the sensor device(s). If, according to one embodiment, a number N of resistors is assumed, which can correspond in particular to a number N of measuring points, the voltage at a particular measuring point depends on the number and size of the resistors arranged in front of the measuring point in the series circuit. Preferably, resistors of the same size are provided at the measuring points, i.e. $R_1 = R_2 = R_3 = \ldots = R_n = R$, wherein R is the (always the same) resistor value of the individual resistors. As a result, the voltage drop across each resistor is the same and a voltage $U_{pos}$ that can be read at a measuring point is directly proportional to the number $N_{pos}$ of measuring points located further forward in the resistor circuit. Depending on the voltage $U_B$ of the voltage source, this results in $$U_{pos} = \frac{U_B \cdot (R_{pos+1} + \ldots + R_N)}{R_1 + R_2 + \ldots + R_{pos} + \ldots + R_N} = \frac{U_B \cdot (N - N_{pos}) \cdot R}{N \cdot R},$$

wherein $N_{pos}$ is the number of resistors before the measuring point and therefore also an indicator of the position of the measuring point and $R_{pos+1}$ is the resistor after the current measuring point. The number $N_{pos}$, which in particular is assigned to and/or corresponds to the number of the measuring point at which the sensor device is positioned, can then be determined as the basis for the identification signal by $$N_{pos} = N - \frac{N \cdot U_{pos}}{U_B}.$$

If the number of measuring points and the supply voltage $U_B$ of the voltage source are known, the identification signal can therefore be determined by simply reading a voltage $U_{pos}$ at the measuring point at which the sensor direction is located. In particular in the event that the number of resistors is undetermined or dependent on the number of sensor devices, e.g. because the resistors are installed in the sensor devices, the number of connected sensor devices can be determined via the current $I_B$ in the resistor series circuit, wherein the number can be calculated as $N = U_B/(I_B \times R)$ with $U_B/I_B = N \times R$ in particular. For example, the control unit and/or the sensor device can be configured to carry out these calculations, in particular automatically.

Additionally or alternatively preferably, the system may comprise a digital-to-analog converter (D/A converter) and/or an analog-to-digital converter (A/D converter), in particular at the measuring point, at the sensor device and/or at the, in particular central, control unit, wherein the D/A converter and/or A/D converter may in particular have a resolution in a range from 4 bits to 32 bits, preferably in a range from 8 bits to 16 bits, particularly preferably 12 bits. 4 bits to 32 bits can be a good value range for processing measurement signals, especially with several sensor devices. 8 bits to 16 bits can be a good range of values to achieve the resolution required for identification. In particular, it has been shown that 12 bits are well suited for achieving sufficient measurement accuracy.

In particular, the total number (N) of resistors in the resistor series circuit and a relative measurement accuracy ($\delta$) of the voltage in percent can be linked via the equation $N = 100\%/|\delta|$. The number of resistors can be N and $|\delta|$ can be the total amount of uncertainty. For example, if the measurement uncertainty is +25%, then $|\delta| = |-25\%| + |+25\%| = |50\%|$. In this example, N=2 sensor devices could therefore be distinguished. This relationship can be explained by dividing the total voltage of the voltage source (corresponding to 100%) into smaller voltage amounts (in %), which are measured to identify the sensor device. Here, $|\delta|$ should not be greater than the voltage drop across a resistor (as a percentage) in order to be able to distinguish between the different voltage signals. For example, a measurement accuracy of +0.05% can be realized. This results in a maximum number of measuring points of $N = 100/|0.05\% + 0.05\%| = 1000$. Consequently, a D/A converter or A/D converter with a resolution of at least (log (1000)/log (2)) bits≈10 bits can be used for this number. Consequently, it has been found that a 12 bit converter is well suited for use in this embodiment of the invention.

Advantageously, the at least one sensor device can be configured to detect a time at which it is supplied with power via the series circuit and to generate the identification signal based on this time. For example, the bus participants of a bus system available for communication can be used to infer the position, wherein the wiring sequence in particular can be decisive. In particular, the at least one sensor device may comprise a switching mechanism for connecting a further sensor device to the series circuit, wherein the at least one sensor device is configured to exclude the further sensor device from the series circuit if it is not itself supplied with power and, as soon as it is itself supplied with power, to connect the further sensor device to the series circuit after a predetermined time interval. For example, one of several sensor devices can be configured to register a time when it is supplied with power, to forward this time in particular to the control unit and, preferably with a time delay, to close a switch, wherein the next sensor device is connected to the power supply. The time difference can therefore be used to easily determine the identification, in particular the local identification, or the identification signal.

Advantageously, the at least one sensor device can comprise an identification means, in particular a QR code and/or a bar code, wherein the measuring point comprises a recognition device and/or wherein a recognition device, in particular a QR scanner and/or a bar scanner, is arranged at the measuring point, wherein the recognition device is configured to detect and/or identify the identification means, wherein the measuring point, the recognition device and/or the sensor device is configured to generate the identification signal for the at least one sensor device on the basis of the identification signal detected or identified by the recognition device. Advantageously, the sensor device can thus be recognized automatically. A combination with one of the other embodiments is also conceivable, e.g. with the resistor series circuit, wherein the system may be configured to automatically recognize whether (any) sensor device is connected to a particular measuring point, wherein the system may be configured to determine the exact positioning of each individual measuring point by means of the other embodiment, e.g. by means of the resistor series circuit described herein. For example, a scan can be used to determine which measuring points are occupied and the resistor series circuit can then be used to determine the order of the sensor devices among the occupied measuring points.

According to a further aspect of the invention, a vehicle, in particular a commercial vehicle and/or trailer, is provided; comprising a system as described herein, wherein the vehicle comprises in particular at least one vehicle axle, advantageously comprising a brake disk, and/or in particular a vehicle wheel, wherein at least one of the measuring points is arranged on the vehicle wheel, on the brake disk and/or on the vehicle axle of the vehicle, wherein in particular at least one measuring point is arranged in each case on a plurality of vehicle wheels and/or vehicle axles. All the advantages and features described for the system can be transferred analogously to the vehicle and vice versa. In particular, the sensor device can be configured to detect at least one status and/or operating variable of the vehicle, the vehicle axle, the brake disk and/or the vehicle wheel, for example by the sensor device comprising a temperature sensor, a pressure sensor, an acceleration sensor, a vibration sensor and/or an optical sensor.

Advantageously, the vehicle can comprise a plurality of vehicle axles, wherein at least one measuring point being arranged on at least two vehicle axles, preferably on the majority of vehicle axles, and particularly preferably on all vehicle axles. Advantageously, each individual axle or, for example, the wheels and/or brake disks of the axles can be monitored, wherein a clear assignment of measurement signals to the individual axles or components can be possible with the aid of the system.

Advantageously, the at least one sensor device can be designed to detect when a vehicle axle assigned to it drives over an obstacle, and wherein the sensor device or the measuring point is configured to generate the identification signal on the basis of a temporal assignment of the driving over of the obstacle, wherein the assigned vehicle axle is in particular a vehicle axle at which the measuring point of the sensor device is arranged or which is closest to the measuring point of the sensor device. For example, the obstacle may be a bump in the road, e.g. a manhole cover or a pothole. This embodiment can have the advantage that the environment or the characteristics of the roadway can be utilized, in particular automatically, to detect the positioning of the at least one sensor device. For example, the system may be configured to use a vehicle speed to establish a relationship between the time of passing and the location of the sensor device. The sensor device can be configured to register and/or query the vehicle speed and to determine the position of the sensor device from the vehicle speed and the time at which the obstacle was passed. In particular, the system can comprise a reference device at a defined position, wherein the reference device is designed to detect when a vehicle axle assigned to it passes over an obstacle and to transmit this information to the control unit, in particular the central control unit, wherein the control unit, in particular the central control unit, can be configured to determine the position of the at least one sensor device based on the identification signal in combination with the information from the reference device and a current vehicle speed.

Advantageously, the sensor device and/or the reference device may comprise an acceleration sensor and may be configured to detect an obstacle passed over by means of the acceleration sensor. In particular, the acceleration sensor may be configured to detect a vertical acceleration, preferably in the area at the axle. Alternatively or additionally, the sensor device and/or the reference device may comprise a sound sensor and may be configured to detect an obstacle that has been driven over by means of the sound generated when the vehicle drives over it. The sound may, for example, be a sound generated by driving over a manhole cover and/or another road bump. A sound and/or acceleration sensor can thus advantageously be used to automatically identify the sensor device. Advantageously, it may be provided that the sensor used for identification is also configured to detect the measurement signal.

According to a further aspect of the invention, a method is provided for the local identification of at least one sensor device, preferably a plurality of sensor devices, for detecting measurement signals in or on a vehicle, wherein the method comprises the following steps:

providing the at least one sensor device at one of a plurality of measuring points in or on the vehicle;

detecting and/or generating an identification signal by the sensor device;

forwarding the identification signal to a, in particular central, control unit;

assigning the at least one sensor device and/or the measurement signals detected by the at least one sensor device to the respective measuring point on the basis of the identification signal by the, in particular central, control unit.

All the advantages and features described for the system and the vehicle can be transferred analogously to the process and vice versa.

A further aspect of the invention is a sensor device, in particular a sensor device as described herein, which is configured in particular to be used in a system as described herein. All the advantages and features described for the system and the vehicle can be transferred analogously to the sensor device and vice versa.

BRIEF DESCRIPTION OF THE DRAWINGS

Further advantages and features of the invention result from the following description of preferred embodiments of the invention with reference to the attached figures. Here, individual features of different embodiments can be combined to form new embodiments.

It Shows

DETAILED DESCRIPTION

Figure 1:
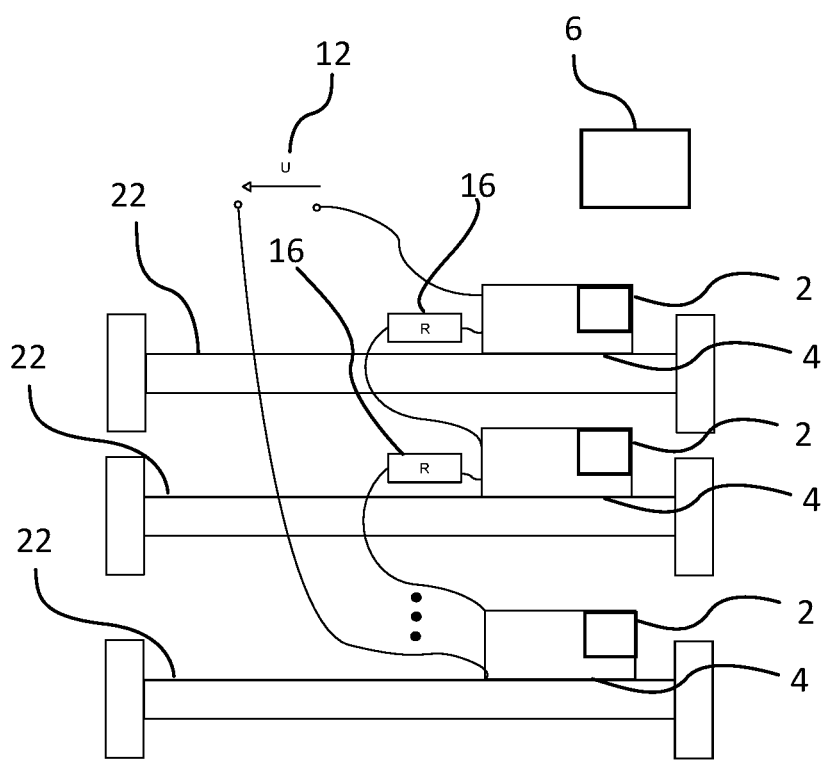
FIG. 1 is a schematic representation of a first embodiment of a system according to the invention.

FIG. 1 shows a schematic representation of an embodiment of a system according to the invention, which is partially and/or completely installed on vehicle axles 22 of a vehicle 20. The system comprises a plurality of sensor devices 2, which are positioned at measuring points 4 on the vehicle axles 22, wherein fundamentally in this or all embodiments of the invention the sensor devices 2 can each be arranged at measuring points 4, advantageously in each case at least one sensor device 2 can be positioned or arranged at a respective measuring point 4. The sensor devices 2 are connected to a control unit 6 via a common line (not shown), via which they can transmit measurement signals and identification signals to the control unit 6. This control unit 6 can be a central control unit.

Figure 2:
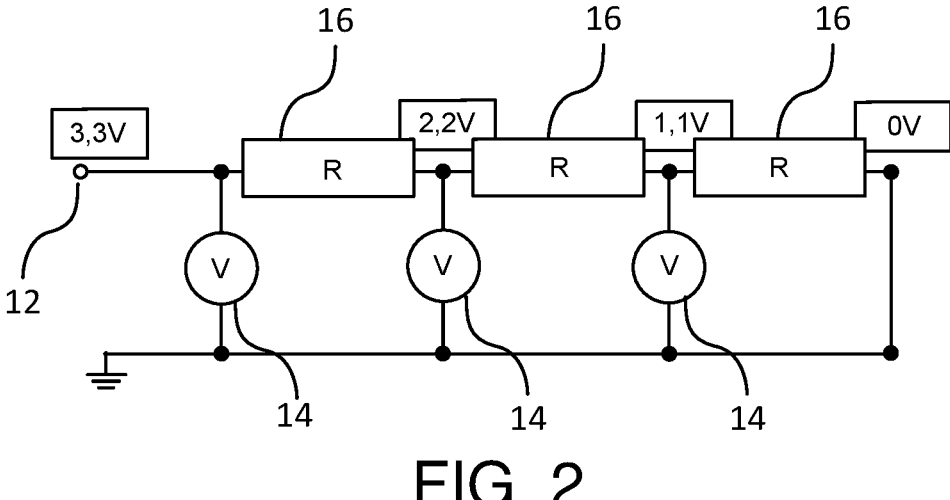
FIG. 2 is a circuit diagram of a resistor series circuit according to one embodiment of the invention.

In this embodiment, the system further comprises a resistor series circuit with several resistors 16. The sensor devices 2 are connected in series via the resistor series circuit, wherein one resistor 16 is arranged between every two sensor devices 2. A circuit diagram of this principle is shown in FIG. 2. In this example, a voltage source 12 or an energy source supplies the series circuit with a voltage of 3.3 V, although other voltage values are also conceivable.

Each sensor device 2 has a voltage sensor 14 in the form of a voltmeter, which can be used to measure the voltage at the respective sensor device 2. A resistor 16 is arranged between each two sensor devices 2, whereby the measured voltage at the respective next sensor device 2 is lower, in this case 1.1 V lower. Accordingly, a voltage of 3.3 V is measured at the first sensor device 2 in this case, a voltage of 2.2 V is measured at the second sensor device 2 and a voltage of 1.1 V is measured at the third sensor device 2. Based on the measured voltage values, each sensor device 2 can be assigned to its respective position or measuring point, in particular uniquely.

Figure 3:
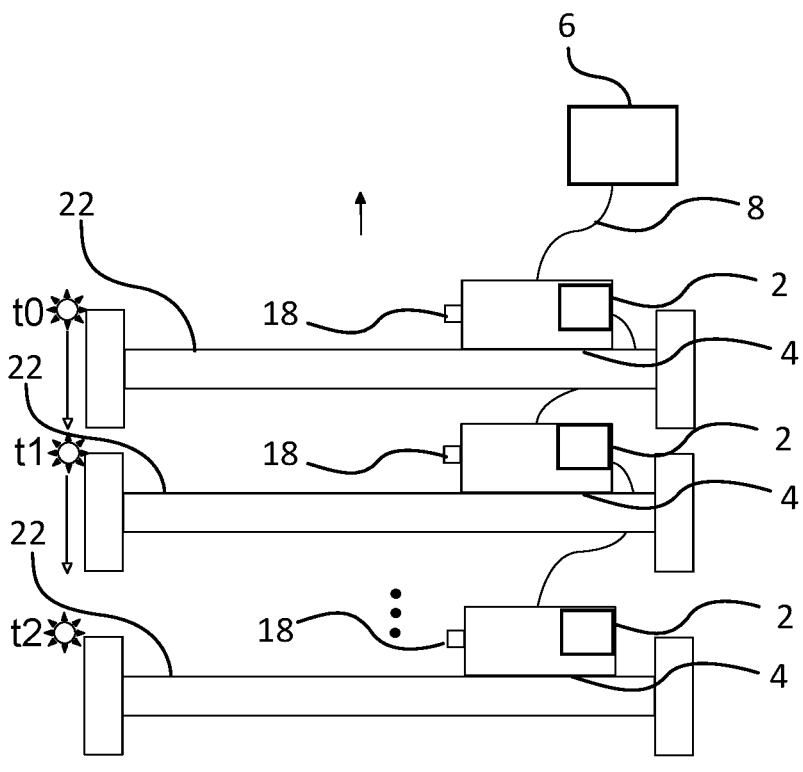
FIG. 3 is a schematic representation of a further embodiment of a system according to the invention.

FIG. 3 shows a schematic representation of a further embodiment of a system according to the invention, which can be installed—at least partially—on vehicle axles 22 of a vehicle 20. In this embodiment, the sensor devices 2 are also positioned at measuring points 4 and are in contact with the control unit 6 by means of a common line 8. In this case, however, the sensor devices 2 are identified with the aid of acceleration sensors 18, which are arranged on the sensor devices 2 and/or can be part of the respective sensor device 2. If the individual vehicle axles 22 drive over an obstacle, this is registered by the acceleration sensors 18. The time at which the vehicle axles 22 pass over the obstacle is then registered by the sensor device 2 and/or the respective measuring point 4 and forwarded to the control unit 6. Depending on the vehicle speed, this time will differ for each of the vehicle axles, wherein the first vehicle axle crosses the obstacle at a time to, the second vehicle axle at a time t1 and the last vehicle axle at a time t2. The position or measuring point of the respective sensor devices 2 can thus be determined on the basis of the registered travel times and, in particular, taking into account the vehicle speed.

Figure 4:
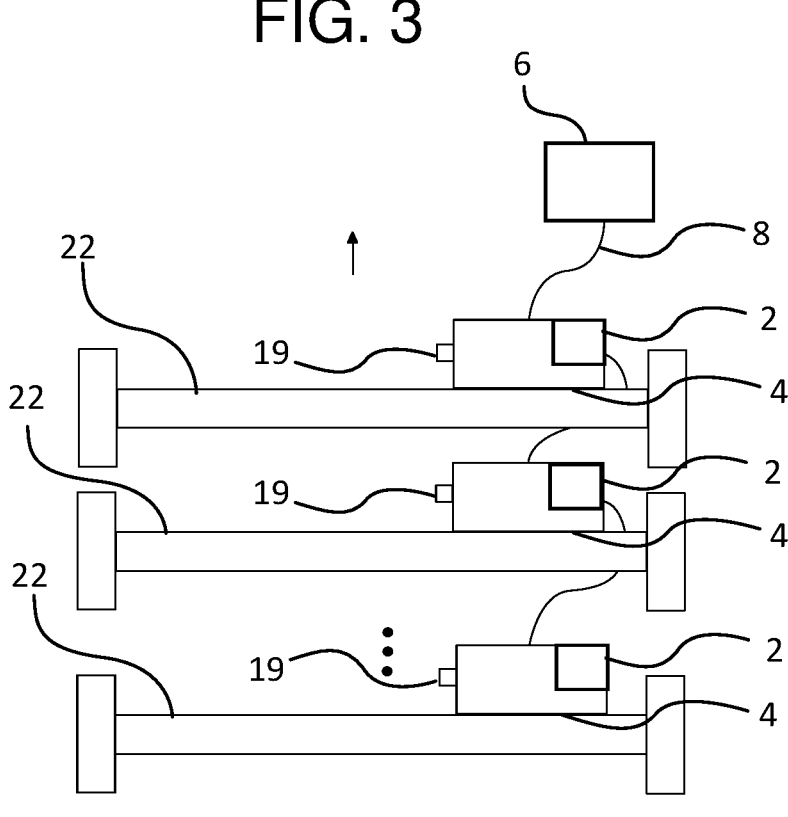
FIG. 4 is a schematic representation of an additional embodiment of a system according to the invention.

FIG. 4 shows a schematic representation of a further embodiment of a system according to the invention, which can be installed on vehicle axles 22 of a vehicle 20. In this embodiment, each of the measuring points 4 has an identification means 19, in particular a QR code scanner, which is configured to detect a QR code at a sensor device 2 positioned at the measuring point 4 and to forward it to the control unit 6. When the sensor device 2 is installed, the position at which the sensor device 2 was installed can thus be determined immediately.

Figure 5:
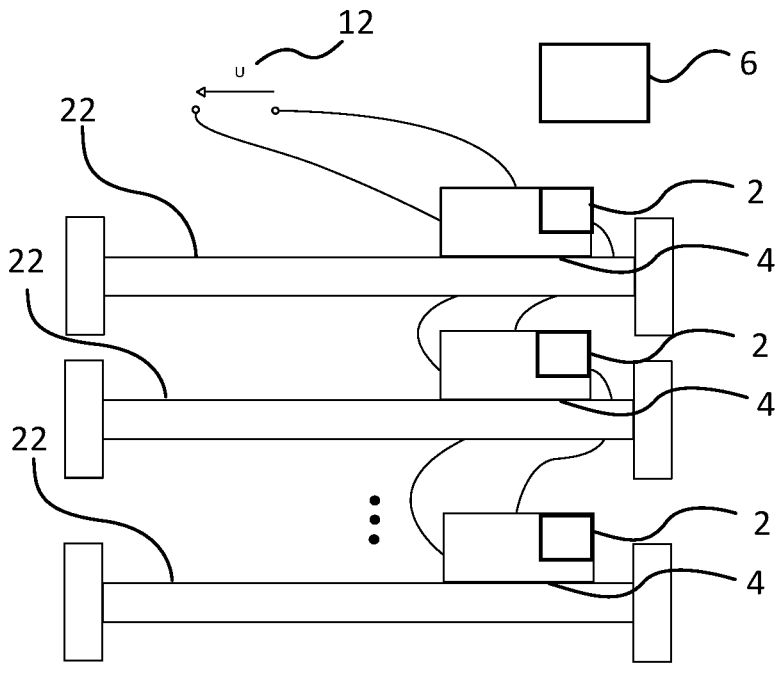
FIG. 5 is a schematic representation of a further embodiment of a system according to the invention.
Figure 6:
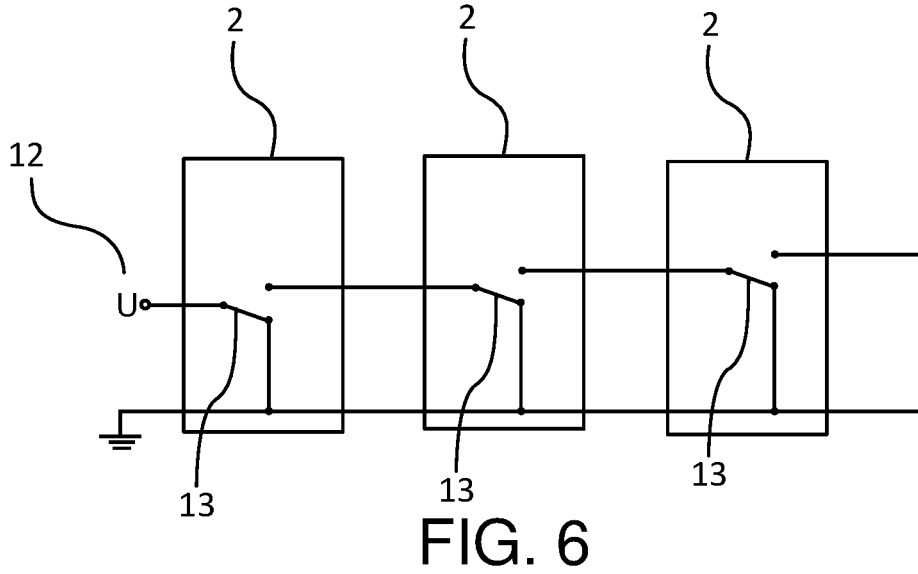
FIG. 6 is a circuit diagram of a series circuit with switches according to the fourth embodiment of the invention.

FIG. 5 shows a schematic representation of another embodiment of a system according to the invention, which is installed on vehicle axles 22 of a vehicle 20. In this embodiment, the system is configured to determine the position of the sensor devices 2 based on the time at which the sensor devices 2 are connected to a circuit. A circuit diagram of a possible series circuit used for this purpose is shown in FIG. 6. Accordingly, each of the sensor devices 2 comprises a switch 13, which is initially set up in such a way that it excludes the next sensor device 2 from the series circuit. As soon as the first sensor device 2 (on the left in the figure) is supplied with power, it registers this time and transmits the time as an identification signal to the control unit 6. After a predetermined time interval, the sensor device 2 then switches the switch 13 and thus connects the next sensor device 2 (here the middle sensor device 2) to the circuit. This also registers the time at which the power supply starts and, after a corresponding predetermined time interval, also switches its switch 13 in order to connect the next sensor device 2. This process can be continued until all sensor devices 2 are connected and have registered the time of their connection.

Figure 7:
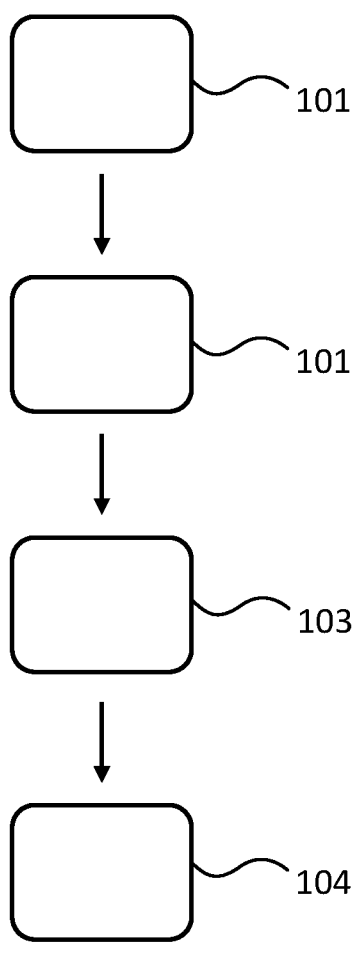
FIG. 7 is a schematic representation of a method according to one embodiment of the invention.

FIG. 7 shows a schematic representation of a method according to one embodiment of the invention. In a first step 101, a plurality of sensor devices 2 are initially provided at measuring points 4 in or on a vehicle 20. This can be done in particular by installing the sensor devices 2 at the measuring points 4 of the vehicle 20. The sensor devices 2 are connected to a control unit 6, which can basically be a central control unit, via the measuring points 4 and a common line 8. The sensor devices 2 can be designed in such a way that they can be installed at different measuring points 4. The following steps serve to identify the sensor devices 2 or to automatically assign the sensor devices 2 to the measuring point 4 at which they are positioned. In a step 102, an identification signal is first detected and/or generated by the sensor device 2. This is done in particular according to one of the embodiments of the system according to the invention described herein. For example, by means of a resistor series circuit and with voltage sensors 14, a different voltage can be detected at the various sensor devices 2 as an identification signal, which can be used for identification or local assignment of the sensor devices 2. In a further step 103, the identification signal is forwarded to a control unit 6, in particular a central control unit. Finally, in a further step 104, the control unit 6 assigns the individual sensor devices 2 or the measurement signals recorded by the sensor devices 2 to their respective measuring point 4 or position on the basis of the identification signal.

Figure 8:
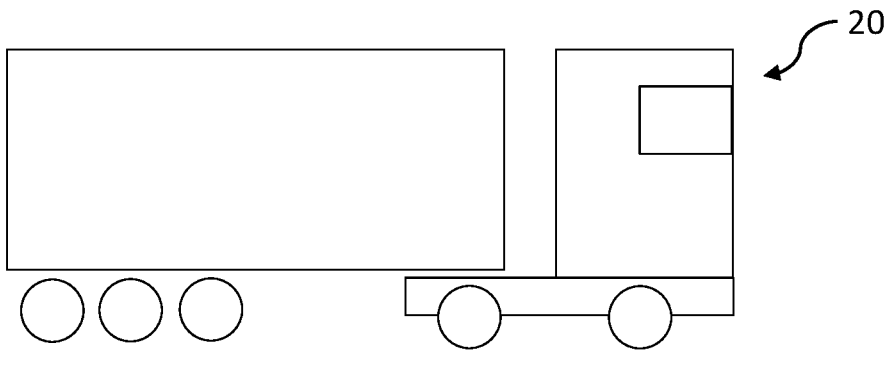
FIG. 8 is a schematic representation of a vehicle according to one embodiment of the invention.

FIG. 8 shows a schematic representation of a vehicle 20 with a system according to one embodiment of the invention. For example, one of the embodiments of a system shown in FIGS. 1 to 7 may be installed in the vehicle 20.

LIST OF REFERENCE SIGNS

2 Sensor device
4 Measuring point
6 Control unit
8 Common line

12 Voltage source
13 Switch, switching mechanism
14 Voltage sensor, voltmeter
16 Resistor
18 Acceleration sensor
19 Identification means
20 Vehicle
22 Vehicle axle

The invention claimed is:

1. A system for identifying at least one sensor device in or on a vehicle, the system comprising:
   at least one sensor device for detecting measurement signals and at least one measuring point, wherein the at least one of the sensor device is positioned and/or positionable at the at least one measuring point; and
   a control unit for collecting and/or evaluating the measurement signals detected by the at least one sensor device;
   wherein the at least one sensor device and/or the measuring point is configured to detect and/or generate a position-dependent identification signal and to forward the position dependent identification signal to the control unit;
   wherein the control unit is configured to assign the at least one sensor device and/or the measurement signals detected by the at least one sensor device to the respective measuring point on the basis of the identification signal;
   wherein the at least one sensor device is part of a series circuit;
   wherein the series circuit comprises a voltage source;
   wherein the at least one sensor device is configured to generate the identification signal on the basis of a voltage signal transmitted via the series circuit;
   wherein the at least one sensor device is configured to detect a time at which the at least one sensor device is supplied with power via the series circuit;
   wherein the at least one sensor device comprises a switching mechanism for connecting a further sensor device to the series circuit; and
   wherein the at least one sensor device is configured to exclude the further sensor device from the series circuit when the further sensor device is not itself powered and to connect the further sensor device to the series circuit after a predetermined time interval once the further sensor device is powered.

2. The system of claim 1, wherein the at least one sensor device includes a plurality of sensor devices and the at least one measuring point includes a plurality of measuring points.

3. The system according to claim 2, wherein each of the measuring points of the plurality of measuring points and/or each of the sensor devices of the plurality of sensor devices is connected to the control unit via a common line which is configured for transmitting the measurement signals and/or the identification signal.

4. The system according to claim 1, wherein the at least one sensor device and/or the at least one measuring point is configured to generate the identification signal on the basis of a detected time difference and/or on the basis of a signal propagation time in connection with a current vehicle speed.

5. The system according to claim 1, wherein the at least one sensor device includes a plurality of sensor devices, and wherein the series circuit is configured such that the signal transmitted via the series circuit is different at each sensor device of the plurality of sensor devices.

6. The system according to claim 1, wherein the series circuit comprises a resistor series circuit that includes a voltage source for generating a voltage, wherein the sensor device is configured to generate the identification signal on the basis of a voltage applied to the at least one sensor device by the voltage source, and wherein the resistor series circuit is configured such that the ap-plied voltage is dependent on the position of the respective measuring point.

7. The system according to claim 6, wherein the plurality of sensor devices includes a plurality of series-connected sensor devices, and wherein each of the sensor devices of the plurality of series-connected sensor devices comprise an electrical resistor forming part of the resistor series circuit.

8. The system according to claim 7, wherein the total number N of electrical resistors in the resistor series circuit and a relative measurement accuracy $\delta$ of the voltage in percent are linked via the equation $N=100\%/|\delta|$.

9. The system according to claim 1, wherein the at least one sensor device comprises an identifier;
   wherein the measuring point comprises a recognition device and/or wherein a recognition device is arranged at the measuring point;
   wherein the recognition device is configured to detect and/or identify the identifier; and
   wherein the measuring point, the recognition device or the sensor device is configured to generate the identification signal for the at least one sensor device on the basis of the identifier detected or identified by the recognition device.

10. The system of claim 9, wherein the identifier includes a QR code.

11. A commercial vehicle and/or trailer, comprising:
   the system according to claim 1;
   at least one vehicle axle, a brake disk and/or in particular a vehicle wheel;
   wherein at least one of the measuring points is arranged on the vehicle wheel, on the brake disk and/or on the vehicle axle of the vehicle.

12. The vehicle of claim 11, wherein the at least one measuring point is arranged on the vehicle wheel and/or the vehicle axle.

13. The vehicle according to claim 11, wherein the at least one sensor device is configured to detect when the vehicle axle of a plurality of vehicle axles of the vehicle associated therewith passes over an obstacle;
   wherein the sensor device or the measuring point is configured to generate the identification signal on the basis of a temporal assignment of the passing over of the obstacle; and
   wherein the vehicle axle is the vehicle axle at which the at least one measuring point of the at least one sensor device is closest to the at least one measuring point of the at least one sensor device of the plurality of vehicle axles.

14. The vehicle according to claim 13, wherein the system further comprises a reference device at a fixed position and configured to detect when the vehicle axle of the plurality of vehicle axles assigned to the vehicle axles passes over an obstacle and to transmit this information to the control unit; and
   wherein the control unit is configured to determine the position of the at least one sensor device based on the identification signal in combination with the information of the reference device and a current vehicle speed.

15. A method for identifying at least one sensor device for detecting measurement signals in or on a vehicle, the method comprising:

providing the at least one sensor device at least one measuring points in or on the vehicle, wherein the at least one sensor de-vice is part of a series circuit;

detecting and/or generating an identification signal by the at least one sensor device, wherein the at least one sensor device generates the identification signal on the basis of a voltage signal transmitted via the series circuit, wherein the sensor device detects a point in time at which it is supplied with power via the series circuit and generates the identification signal on the basis thereof, wherein the at least one sensor device comprises a switching mechanism for connecting a further sensor device to the series circuit, wherein the at least one sensor device excludes the further sensor device from the series circuit when the further sensor is not itself supplied with power and connects the further sensor device to the series circuit after a predetermined time interval as soon as the further sensor device is supplied with power;

forwarding the identification signal to a control unit; and assigning the at least one sensor device and/or the measurement signals detected by the at least one sensor device to the respective measuring point of the at least one measuring point on the basis of the identification signal by the control unit.

16. The method of claim 15, wherein the at least one sensor device includes a plurality of sensor devices and wherein the at least one measuring point includes a plurality of measurement points.

* * * * *